(No Model.)
R. V. BOICE.
CUTTER HEAD.
No. 275,459. Patented Apr. 10, 1883.
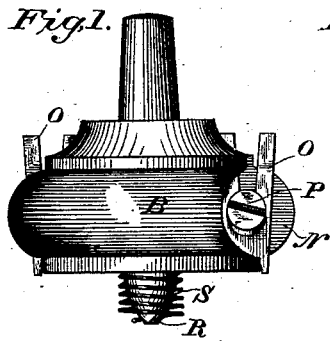
Fig. 1.
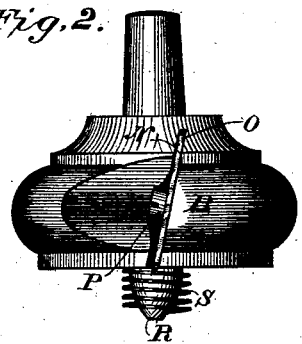
Fig. 2.
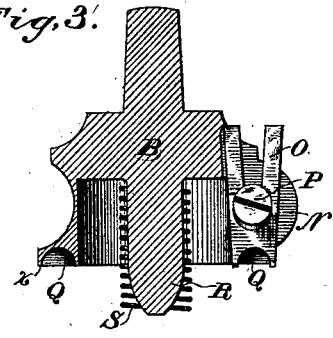
Fig. 3.
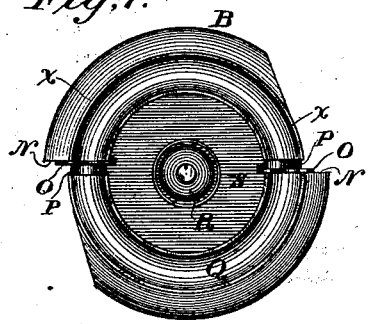
Fig. 4.
Fig. 7.
Fig. 8.
Fig. 5.
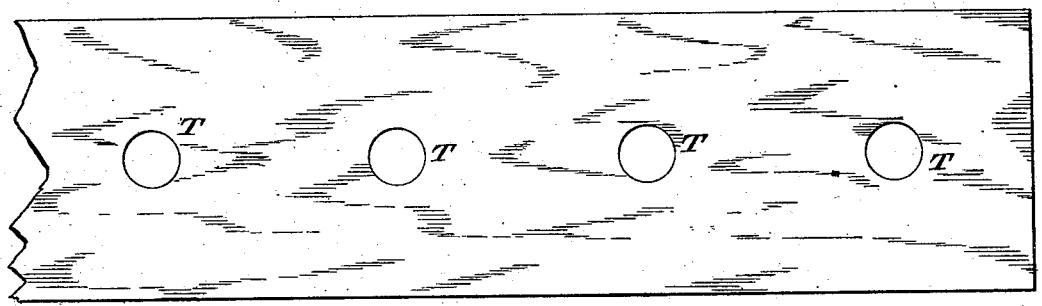
Fig. 6.
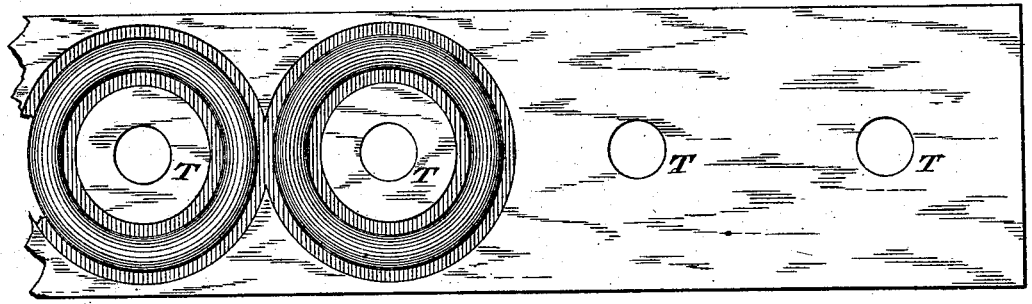
WITNESSES
Wm A. Skinkle
Geo W Young
INVENTOR
Reed V. Boice.
By his Attorneys
Baldwin, Hopkins & Peyton.
N. PETERS, Photo-Lithographer, Washington, D. C.

UNITED STATES PATENT OFFICE.

REED V. BOICE, OF TOLEDO, OHIO.

CUTTER-HEAD.

SPECIFICATION forming part of Letters Patent No. 275,459, dated April 10, 1883.

Application filed March 8, 1883. (No model.)

*To all whom it may concern:*

Be it known that I, REED V. BOICE, of Toledo, in the county of Lucas and State of Ohio, have invented certain new and useful Improvements in Cutter-Heads for Use in Lathes, &c., of which the following is a specification, reference being had to the accompanying drawings, in which—

Figure 1 is a side elevation of my improved cutter-head. Fig. 2 is a similar view, taken at right angles to Fig. 1. Fig. 3 is a central vertical section of the same. Fig. 4 is a bottom plan view. Fig. 5 is a blank strip or board prepared for being cut. Fig. 6 is a similar blank, showing two cuts already made by my cutter. Fig. 7 is a cross-section of the blank cut upon one side, and Fig. 8 is a cross-section of the same cut upon both sides.

My improved cutter-head is especially designed for use in turning wooden curtain-rings; but it is also applicable for other purposes.

Referring to the letters upon the drawings, A indicates an arbor, which may be connected with any suitable machinery for giving it rotary motion; and B indicates my improved cutter-head, which is attached to the arbor in any suitable manner so as to be readily detachable, but preferably, as illustrated in the drawings, by means of a shank fitting within a socket in the arbor concentric with its axis. The lower end of the cutter-head is dish-shaped or cup-shaped, and provided with one or more inclined seats, N, to which one or more cutters, O, are secured by means of set-screws P. These cutters preferably straddle the set-screws, as shown, and are adjustable up and down to regulate the depth of cut. Their cutting-edges are of course semicircular when they are designed for cutting curtain-rings; but when designed for cutting circular grooves of any kind, or rings having small circular grooves or projections, their cutting-edges may be varied accordingly.

The bottom of the cutter-head is provided with a semicircular groove, Q, or with any other conformation to correspond with the outlines of the cutting-edges of the cutters. The result will be that the cutting-edges will project at all points equally below the bottom of the cutter-head and operate as the blade of a plane operates with reference to the bottom of the plane, and the thickness of the shaving cut may be regulated by setting the cutters up or down, as the blade of a plane is set by a carpenter.

The cutter-head is also provided with a shoulder or stop, $x$, to limit the depth of cut, which it does by bearing against the stock outside of the cutters whenever a cut sufficiently deep is made.

Projecting from the center of the cup of the cutter-head is a pin, R, provided with a coiled spring, S, the pin being preferably pointed or conical at its lower end.

The blank shown in Fig. 5 is provided with holes T of a size to admit the pin R, and of the proper distance apart to permit rings to be cut without waste of the stock. Such a blank is placed upon a suitable table, (not illustrated,) its first hole being about coincident with a similar hole in the table in line with the axis of the center-pin R. The cutters being properly adjusted, and the cutter-head being in rapid revolution through power applied to the arbor C, and the table-top carrying the blank being raised by any suitable appliance to carry up the stock, the center-pin passes through the first hole T, and the cutters rapidly do their work. The blank is then lowered (the spring S helping to release the center-pin) and moved along, and the successive cuts are made in a similar manner. Afterward it can be turned over and cut upon the opposite side in the same way, which will, according to the construction of cutter-head illustrated in the drawings, form curtain-rings, the depth of the cuts being such where the stock is of suitable thickness as to substantially sever the rings from the board. The conical point of the center-pin R serves to facilitate the centering of the stock, because as it is raised up against the cutter the pin wedges or pushes it slightly endwise, as may be necessary to exactly center it.

Having thus described my invention, what I claim, and desire to secure by Letters Patent of the United States, is—

1. The detachable cup-shaped cutter-head B, provided with a conical center-pin, R, a cutter or cutters, O, set-screws P, the bottom groove, Q, corresponding to the outlines of the cutting-edges of the cutters, and the shoulder or stop $x$, substantially as and for the purposes set forth.

2. The detachable cup-shaped cutter-head B, provided with a conical center-pin, R, the coiled spring S, a cutter or cutters, O, set-screws P, the bottom groove, Q, corresponding to the outlines of the cutting-edges of the cutters, and the shoulder or stop $x$, substantially as and for the purposes set forth.

In testimony whereof I have hereunto subscribed my name this 19th day of February, A. D. 1883.

REED V. BOICE.

Witnesses:
CHS. C. DOOLITTLE,
MONROE C. WARN.